Patented Nov. 30, 1943

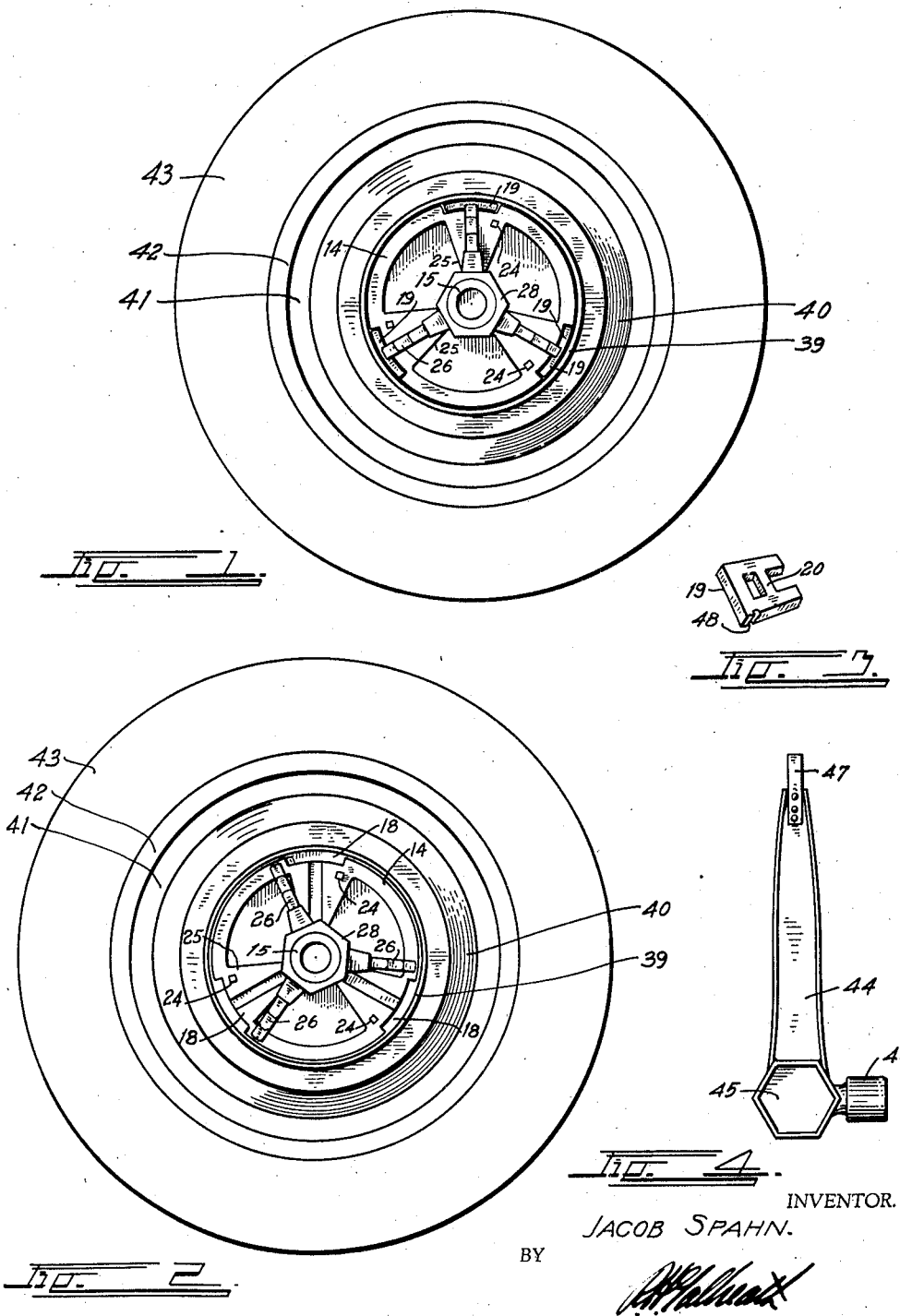

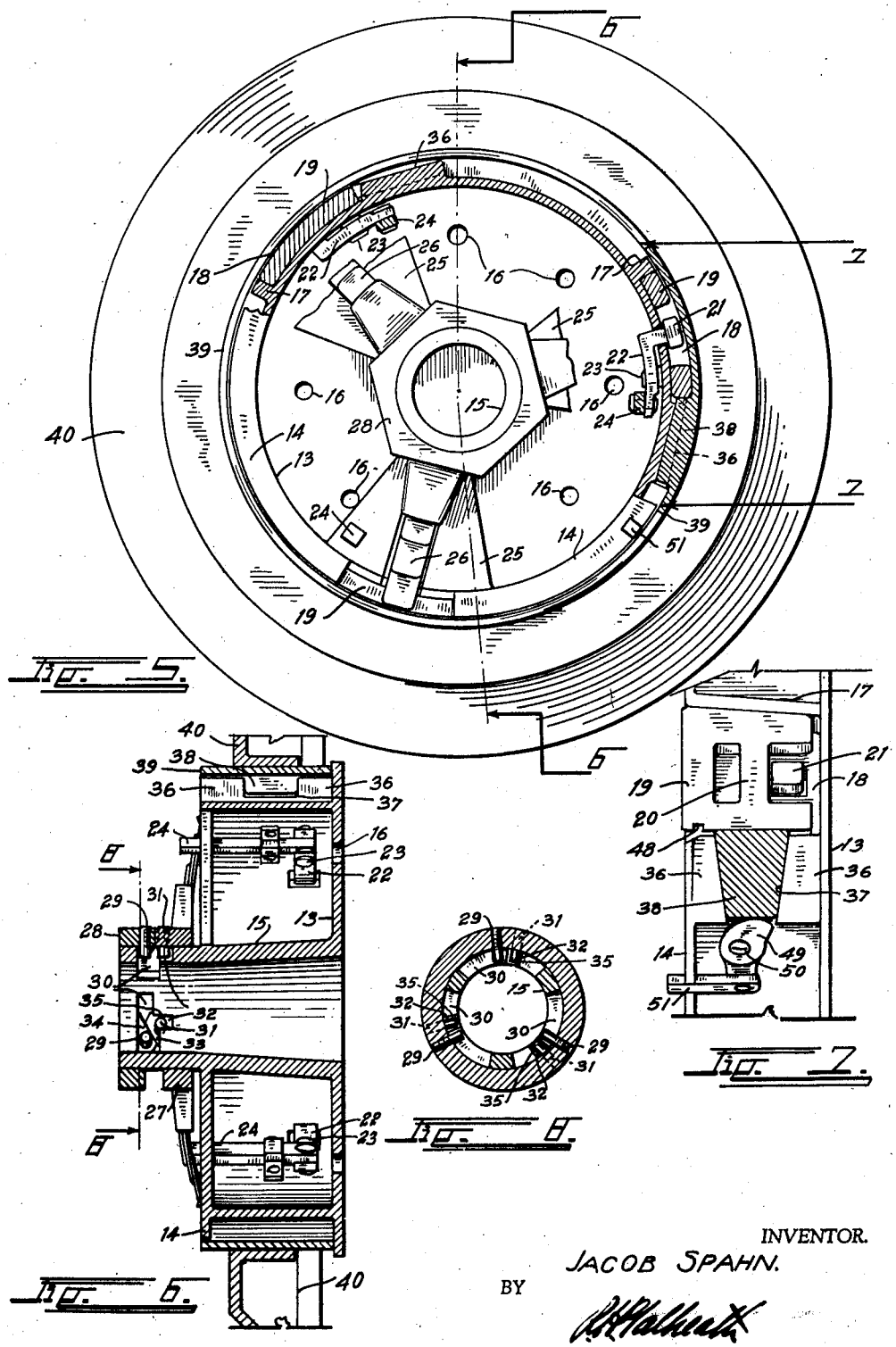

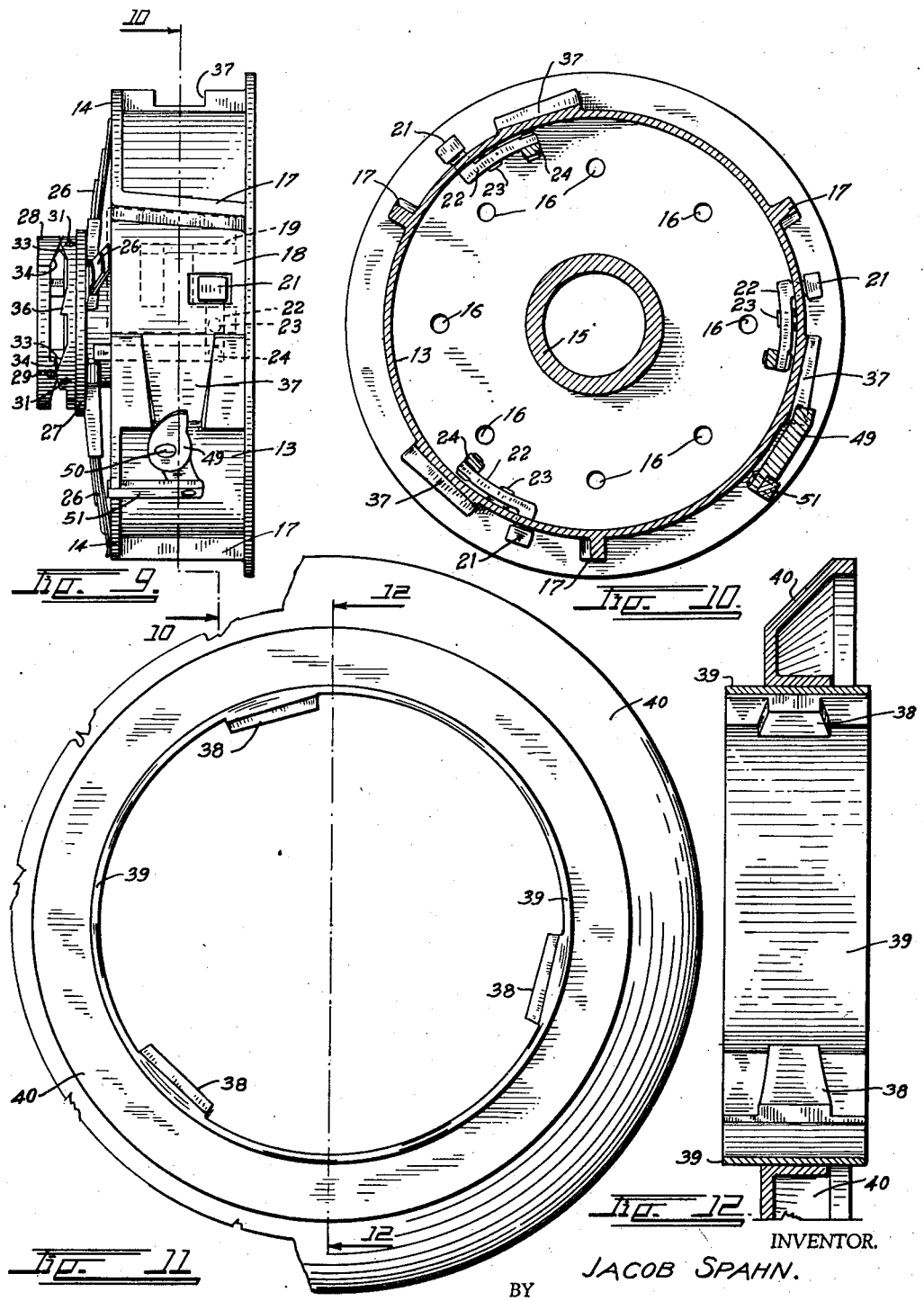

2,335,548

UNITED STATES PATENT OFFICE 2,335,548

RAPID-CHANGE VEHICLE WHEEL

Jacob Spahn, Denver, Colo.

Application December 11, 1942, Serial No. 468,871

10 Claims. (Cl. 301—9)

This invention relates to a demountable wheel for vehicles and has for its principal object the provision of a mounting mechanism which will enable wheels to be mounted and dismounted in a fraction of the time at present required.

Other objects of the invention are: to eliminate the multiple bolts and nuts at present employed on demountable wheels and to provide a structure which, while quickly and easily operable, will positively lock the wheel against looseness and loss.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a face view of an automotive vehicle wheel locked in place by the use of the present invention;

Fig. 2 is a similar view, illustrating the improved locking mechanism in the unlocked position ready for removal of the wheel;

Fig. 3 is a detail view of one of the wedging keys employed in the improved wheel mounting device;

Fig. 4 is a detail view of a wrench or tool by means of which the improved mounting device is operated;

Fig. 5 is a face view of the wheel with portions of the hub member and mounting devices broken away to illustrate the interior construction;

Fig. 6 is a vertical section through the hub portion, taken on the line 6—6, Fig. 5;

Fig. 7 is a detail sectional view, taken on the line 7—7, Fig. 5;

Fig. 8 is a detail section taken on the line 8—8, Fig. 6;

Fig. 9 is a side view of the mounting hub with the wheel removed therefrom;

Fig. 10 is a vertical cross section through the mounting hub, taken on the line 10—10, Fig. 9;

Fig. 11 illustrates the appearance of the wheel with the hub portion removed therefrom; and Fig. 12 is a vertical section through the wheel, taken on the line 12—12, Fig. 11.

The invention employs a cylindrical drum 13 which projects concentrically from a circular face plate 14. A tubular hub 15 projects axially from the face plate, through and beyond the drum 13.

The above hub structure may be mounted to the axle of the vehicle in any desired manner, such as by keying the hub 15 directly to the axle or by bolting or riveting the face plate 14 to the usual brake drum with which the usual automotive vehicle is provided. The latter method is preferred and suitable holes 16 are provided for the bolts or rivets. Thus, the described hub structure becomes a permanent part of the vehicle.

Ridges 17 are raised from the peripheral surface of the drum to outline three or more key pockets 18 on the surface. It is preferred to have three of these keyways, as illustrated, to receive three wedge keys such as illustrated at 19 in Fig. 3. Each of the wedge keys is formed with a cross bar 20 which, when the key is forced into place, contacts a kicker 21.

The kickers are carried on the extremities of kicker levers 22 which are pivoted on suitable pivot studs 23 on the interior of the drum 13. The opposite extremities of the kicker levers 22 are hingedly secured to plungers 24 which project forwardly through spider arms 25 on the front face of the drum. Thus, when the wedge keys are forced into place, the plungers are projected outwardly and, when it is desired to force the wedge keys from place the plungers are driven or forced inwardly to cause the kickers 21 to drive the wedge keys outwardly.

The wedge keys are held in place by means of radially positioned, multiple leaf springs 26. The springs are secured at their axial extremities to a spring sleeve 27 which is rotatably mounted on the projecting extremity of the hub 15. The spring sleeve 27 is held in place on the hub 15 by means of a nut collar 28 formed with nut-engaging faces about its periphery. The nut collar 28 is held in place by means of studs 29 which project into circumferentially slotted openings 30 in the hub 15. The latter openings allow a limited rotative movement of the nut but prevent axial movement thereof. The spring sleeve 27 is also provided with studs 31 which travel in the slotted openings 30 to limit the rotative movement of the spring sleeves. The slots 30 are provided with lateral extending pockets 32 which receive the studs 31 when the mechanism is in the locked position, as will be later described, and with limiting shoulders 35 to stop the studs 31 in advance of the studs 29.

The outer face of the spring sleeve 27 is formed with inclined cam bosses 33 on its face which coact with similar, oppositely facing inclined cam bosses 34 on the nut collar 28. Thus, when the nut collar is rotated clockwise, its bosses 33 contact the bosses 34 causing the spring sleeve 27 and the springs 26 to rotate simultaneously. When the studs 30 reach the slot shoulders 35, the rotation of the springs will be stopped. At this time the extremities of the springs will be over the wedge keys 19. Further rotation of the nut collar causes the contacting, inclined faces of the cam bosses to slide along each other to push the spring sleeve inwardly to flex the springs against the wedge keys to hold the latter in place at this time the studs 31 are moving into the lateral pockets 32. The flexing of the springs continues until the high points of the coacting cam bosses pass each other, as shown in Fig. 9, to prevent return movement of the nut collar. Further forward rotation of the nut collar is impossible for at this time the studs 29 have reached the end of the slotted openings 30. The device is therefor locked in place.

Counterclockwise rotation of the nut collar 28 causes a slight flexing of the spring, this is, until the two high points of the cam bosses again approach and pass each other, to release the nut collar and allow the inclined faces of the cam bosses to slide down each other to release the flexure in the springs. When this has been accomplished, the bosses 34 on the nut collar contact lugs 36 on the spring sleeve 27 to rotate the springs 26 away from the locking wedge keys 19 to allow removal of the latter.

At the forward side (in a clockwise direction) of each wedge key pocket 18 is a tapered socket 37 for receiving a similarly tapered lug 38 on the wheel portion of the device.

The wheel portion comprises an open-ended circular band 39 of sufficient diameter to slide snugly over the ridges 17 on the drum 15 and rest against the face plate 14. The wheel may be fixedly mounted on this open-ended band in any desired manner. As illustrated, an annular wheel disc 40 is welded or otherwise secured on the band or is formed as an integral part thereof. The felloe of the wheel, indicated at 41, is carried on the periphery of the wheel disc and a rim 42, carrying a tire 43 is mounted on the felloe 41.

Three of the tapered lugs 38 are formed on the inner face of the wheel band at positions to register with the receiving sockets 37 on the drum 13. The lugs 38 correspond exactly to the shape of their receiving sockets so that a large bearing surface is obtained and all looseness is eliminated.

*Operation*

To place the wheel on the hub, it is only necessary to slide the wheel band 39 over the drum 13, with the lugs 38 entering the key pockets 18, as shown in Fig. 2, until it strikes the face plate 14. The wheel is now rotated clockwise to cause the tapered lugs 38 to enter the tapered receiving pockets 37.

The wedge keys 19 are now inserted into the key pockets 18 and driven home as shown in Fig. 7. The nut collar 28 is now rotated to swing the extremities of the springs thereagainst and the operation is complete. The wheel is now locked against movement in any direction relative to the hub structure.

To remove the wheel, it is only necessary to rotate the nut collar 28 to the left sufficiently far to swing the springs from the wedge keys. The plungers 24 are now tapped with any suitable tool causing the kickers 21 to kick the wedge keys from place. The wheel is now rotated to the left to bring the lugs 38 into the key pockets 18 and the wheel is free to be pulled from place.

The entire removal and replacement can be accomplished in from eight to fifteen seconds.

Any suitable tool may be used. In Fig. 4 such a tool is illustrated consisting of a handle 44 terminating at one extremity in a wrench socket 45 for receiving the nut collar 28. A hammer head 46 is provided for driving the wedge keys into place and for striking the plungers 24 to release the wedge keys. A prying extremity 47 is also provided. This may be found useful to remove wedge keys which have become stuck or rusted in place. Each wedge is provided with a suitable pry notch 48 to receive this extremity 47.

To assist in removing the tapered lugs 38 from the sockets, a prying cam 49 is provided at the head of one of the sockets 37. This cam is pivoted on the drum 13 by means of a suitable pivot screw 50 and is actuated by a push rod 51 extending to the face of the hub structure. If this push rod is driven inwardly, it will rotate the prying cam to force all of the tapered lugs from their sockets.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A demountable wheel structure comprising: a cylindrical hub portion; a cylindrical wheel portion fitting over said hub portion; wedge-shaped lugs formed on the inner face of said wheel portion; wedge-shaped sockets formed on the outer face of said hub portion for receiving said lugs, said lugs and sockets being positioned so that relative rotation between the two portions will cause the lugs to enter the sockets; stop keys inserted behind said lugs to prevent them from withdrawing from said sockets; releasable means for holding said keys in place; and kicker members for forcing said keys from place to release said lugs.

2. A demountable wheel structure comprising: a cylindrical hub portion; a cylindrical wheel portion fitting over said hub portion; wedge-shaped lugs formed on the inner face of said wheel portion; wedge-shaped sockets formed on the outer face of said hub portion for receiving said lugs, said lugs and sockets being positioned so that relative rotation between the two portions will cause the lugs to enter the sockets; means for preventing withdrawal of said lugs from said sockets; a forcing member for forcing said lugs from said sockets to release said wheel member; and kicker members for forcing said keys from place to release said lugs.

3. A demountable wheel structure comprising: a cylindrical hub portion; a cylindrical wheel portion fitting over said hub portion; wedge-shaped lugs formed on the inner face of said wheel portion; wedge-shaped sockets formed on the outer face of said hub portion for receiving said lugs, said lugs and sockets being positioned so that relative rotation between the two portions will cause the lugs to enter the sockets; stop keys inserted behind said lugs to prevent them from withdrawing from said sockets; a rotatable member axially mounted within said hub member; arms extending from said rotatable member; and means for rotating said latter member to cause said arms to engage said keys to hold the latter in place.

4. A demountable wheel structure comprising: a cylindrical hub portion; a cylindrical wheel portion fitting over said hub portion; wedge-shaped lugs formed on the inner face of said wheel portion; wedge-shaped sockets formed on the outer face of said hub portion for receiving said lugs, said lugs and sockets being positioned so that relative rotation between the two portions will cause the lugs to enter the sockets; stop keys inserted behind said lugs to prevent them from withdrawing from said sockets; a rotatable member axially mounted within said hub member; arms extending from said rotatable member; means for rotating said latter member to cause said arms to engage said keys to hold the latter in place; and means for forcing said rotatable member inwardly toward said keys to cause said arms to be forced against said keys.

5. A demountable wheel structure comprising: a cylindrical hub portion; a cylindrical wheel portion fitting over said hub portion; wedge-shaped lugs formed on the inner face of said wheel portion; wedge-shaped sockets formed on the outer face of said hub portion for receiving said lugs, said lugs and sockets being positioned so that relative rotation between the two portions will cause the lugs to enter the sockets; stop keys inserted behind said lugs to prevent them from withdrawing from said sockets; a rotatable member axially mounted within said hub member; arms extending from said rotatable member; means for rotating said latter member to cause said arms to engage said keys to hold the latter in place; means for forcing said rotatable member inwardly toward said keys to cause said arms to be forced against said keys; and means for locking said rotatable member in its inwardly forced position.

6. A demountable wheel structure comprising: a cylindrical hub portion; a cylindrical wheel portion fitting over said hub portion; wedge-shaped sockets formed on the outer face of said hub portion for receiving said lugs, said lugs and sockets being positioned so that relative rotation between the two portions will cause the lugs to enter the sockets; stop keys inserted behind said lugs to prevent them from withdrawing from said sockets; a rotatable member axially mounted within said hub member; arms extending from said rotatable member; means for rotating said latter member to cause said arms to engage said keys to hold the latter in place; inclined faces on said rotatable member; an actuating nut; inclined faces on said nut cooperating with the first faces to first rotate said rotatable member and then force the latter inwardly.

7. A demountable wheel structure comprising: a cylindrical hub portion; a cylindrical wheel portion fitting over said hub portion; wedge-shaped sockets formed on the outer face of said hub portion for receiving said lugs, said lugs and sockets being positioned so that relative rotation between the two portions will cause the lugs to enter the sockets; stop keys inserted behind said lugs to prevent them from withdrawing from said sockets; a rotatable member axially mounted within said hub member; arms extending from said rotatable member; means for rotating said latter member to cause said arms to engage said keys to hold the latter in place; inclined faces on said rotatable member; an actuating nut; inclined faces on said nut cooperating with the first faces to first rotate said rotatable member and then force the later inwardly; and means for stopping the rotation of said rotatable member and said actuating nut in sequence.

8. A demountable wheel structure comprising: a cylindrical hub portion; a cylindrical wheel portion fitting over said hub portion; wedge-shaped lugs formed on the inner face of said wheel portion; wedge-shaped sockets formed on the outer face of said hub portion for receiving said lugs, said lugs and sockets being positioned so that relative rotation between the two portions will cause the lugs to enter the sockets; stop keys inserted behind said lugs to prevent them from withdrawing from said sockets; a rotatable member axially mounted within said hub member; and leaf springs extending radially from said rotatable member, said springs being positioned to engage said keys upon rotation of said rotatable member to hold the keys in place.

9. A demountable wheel structure comprising: a cylindrical hub portion; a cylindrical wheel portion fitting over said hub portion; wedge-shaped lugs formed on the inner face of said wheel portion; wedge-shaped sockets formed on the outer face of said hub portion for receiving said lugs, said lugs and sockets being positioned so that relative rotation between the two portions will cause the lugs to enter the sockets; stop keys inserted behind said lugs to prevent them from withdrawing from said sockets; a rotatable member axially mounted within said hub member; leaf springs extending radially from said rotatable member, said springs being positioned to engage said keys upon rotation of said rotatable member to hold the keys in place; and means for forcing said rotatable member toward said keys so as to flex said springs thereagainst.

10. A demountable wheel structure comprising: a cylindrical hub portion; a cylindrical wheel portion fitting over said hub portion; wedge-shaped lugs formed on the inner face of said wheel portion; wedge-shaped sockets formed on the outer face of said hub portion for receiving said lugs, said lugs and sockets being positioned so that relative rotation between the two portions will cause the lugs to enter the sockets; stop keys inserted behind said lugs to prevent them from withdrawing from said sockets; a rotatable member axially mounted within said hub member; arms extending from said rotatable member; inclined faces on said rotatable member; an actuating nut axially mounted adjacent the outer face of said rotatable member; oppositely inclined faces on said nut cooperating with the first face to transmit rotation from said nut to said rotatable member; and means for stopping the rotation of said rotatable member in advance of the rotation of said nut so that said cooperating inclined faces will slide on each other to force said operating member inwardly to force said arms against said keys.

JACOB SPAHN.